(12) United States Patent
Takahashi et al.

(10) Patent No.: US 9,187,023 B2
(45) Date of Patent: Nov. 17, 2015

(54) UTILITY VEHICLE

(71) Applicant: KAWASAKI JUKOGYO KABUSHIKI KAISHA, Hyogo (JP)

(72) Inventors: Keiji Takahashi, Akashi (JP); Yoshinori Tsumiyama, Miki (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 0 days.

(21) Appl. No.: 14/140,022

(22) Filed: Dec. 24, 2013

(65) Prior Publication Data
US 2015/0175047 A1    Jun. 25, 2015

(51) Int. Cl.
*B60P 1/16* (2006.01)
*B60P 1/04* (2006.01)

(52) U.S. Cl.
CPC .... *B60P 1/16* (2013.01); *B60P 1/04* (2013.01)

(58) Field of Classification Search
CPC ............... B60P 1/04; B60P 1/16; B60P 1/28; B60P 1/283

USPC ... 298/17 R, 19 B, 19 R, 22 P, 22 R; 296/205
See application file for complete search history.

(56) References Cited

U.S. PATENT DOCUMENTS 6,394,555 B2    5/2002  Mizuta et al.
7,168,767 B2 *  1/2007  Linares et al. ............... 298/1 A

* cited by examiner

*Primary Examiner* — Stephen Gordon
(74) *Attorney, Agent, or Firm* — Wenderoth, Lind & Ponack, L.L.P.

(57) ABSTRACT

A utility vehicle is equipped with a chassis, one or more rows of seats disposed on the chassis, and a cargo bed disposed behind the one or more rows of seats. The cargo bed is rotatably supported by a pivot shaft of the chassis so as to be movable up and down between a normal position in which the cargo bed is in a non-raised state and a dump position in which the cargo bed is in a raised state. Concave portions for cargo bed raising use that are used to raise the cargo bed by hand are integrally formed respectively in the left and right side walls of the cargo bed.

6 Claims, 10 Drawing Sheets

UTILITY VEHICLE

BACKGROUND OF THE INVENTION

1. Field of the Invention

The present invention relates to a utility vehicle, and more particularly, to a utility vehicle having a cargo bed configured so as to be able to dump.

2. Description of the Related Art

In a utility vehicle having a cargo bed configured so as to be able to dump, a handle is provided at the lower portion of the cargo bed, and the dump operation of the cargo bed can be carried out manually by the user by gripping and moving the handle upward. For example, in U.S. Pat. No. 6,394,555, a handle is disclosed that is provided so as to protrude downward from the lower portion of a cargo bed.

However, in the case that a grip portion, such as the above-mentioned handle, that is used to raise the cargo bed is provided on the cargo bed, it is necessary to prepare the grip portion as a separate member and to install the grip portion at the lower portion of the cargo bed, for example, by welding or with bolts. In other words, since the grip portion is required as a separate member, the number of components is increased, and man-hours are required to install the grip portion provided as a separate member at the lower portion of the cargo bed. As a result, the cost of the grip portion for dump operation becomes high.

SUMMARY OF THE INVENTION

In consideration of the above-mentioned problems, an object of the present invention is to provide a utility vehicle in which the workability of the dump operation of a cargo bed can be improved while the design of a grip portion that is gripped by the user to raise the cargo bed during dump operation is rationalized.

In order to achieve the above-mentioned object, a utility vehicle according to the present invention is equipped with a chassis, one or more rows of seats disposed on the chassis, and a cargo bed disposed behind the one or more rows of seats. The cargo bed is rotatably supported by the pivot shaft of the chassis so as to be movable up and down between a normal position in which the cargo bed is in a non-raised state and a dump position in which the cargo bed is in a raised state. Concave portions for cargo bed raising use that are used to raise the cargo bed by hand are integrally formed respectively in the left and right side walls of the cargo bed.

With the above-mentioned configuration, since the concave portions for cargo bed raising use are integrally formed with the side walls of the cargo bed, it is not necessary to provide grip portions for raising the cargo bed as separate members, whereby the design of the grip portions can be rationalized. Hence, the number of components is decreased and man-hours for installation are reduced, whereby the productivity of the utility vehicle is improved and its cost can be reduced.

In addition, since the grip portions provided as separate members can be made unnecessary, the weight of the cargo bed is reduced, whereby the workability of the dump operation of the cargo bed can be improved.

In the above-mentioned utility vehicle, the following configurations can preferably be adopted.

(a) Below the cargo bed, side covers for covering the sides of the chassis are disposed, and in the upper portions of the side covers, concave portions for hand insertion use are integrally formed at positions corresponding to the concave portions for cargo bed raising use so that the concave portions for cargo bed raising use are extended downward.

With the above-mentioned configuration (a), the user's hand can easily gain access to each concave portion for cargo bed raising use through the concave portion for hand insertion use formed in each side cover without interfering with the side cover. Hence, the workability of the dump operation of the cargo bed can be improved further.

(b) A pair of left and right hooks is provided at both the side portions of the cargo bed, the cargo bed is configured so as to be able to be fixed to the normal position by engaging the pair of left and right hooks with a pair of left and right engaging device provided on the chassis, and openings through which the hooks are visible from the sides of the vehicle are formed respectively in the left and right side walls.

With the configuration (b), since the engagement states between the hooks and the engaging device can be confirmed easily through the openings, the workability of the engagement of the engaging device with the hooks can be improved. In addition, the engagement states of both the left and right engagement portions can be confirmed simultaneously through the openings from one side of the utility vehicle in the width direction thereof. Hence, the state of the cargo bed fixed to the chassis can be confirmed in a short time.

(c) Between the cargo bed and the chassis, a damper is installed to energize the cargo bed to the dump position and/or to make the rotation of the cargo bed from the dump position to the normal position slow.

With the configuration (c), since the rotation of the cargo bed from the normal position to the dump position is assisted by the damper, the workability of the dump operation of the cargo bed can be improved. Furthermore, by the damper, the position of the cargo bed located at the dump position can be held, and the rotation from the dump position to the normal position can be implemented slowly.

DETAILED DESCRIPTION OF THE INVENTION

Embodiments according to the present invention will be described on the basis of the accompanying drawings.

[Overall Structure of the Vehicle]

Figure 1:
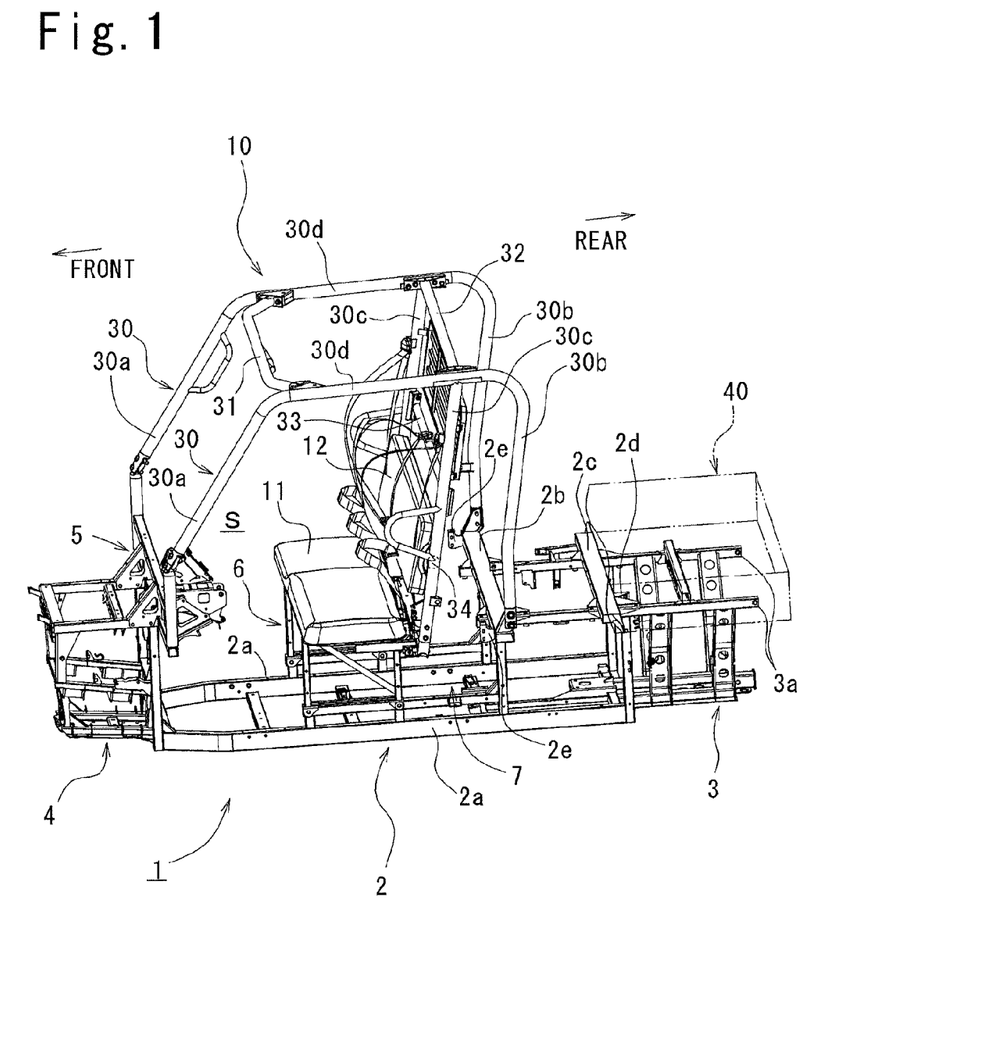
FIG. 1 is a perspective view showing the skeleton structure of a utility vehicle according to the present invention, seen from left above.

In FIG. 1, the skeleton of a utility vehicle according to the present invention includes a vehicle body frame (chassis) 1 being long in the front-rear direction of the vehicle and a R.O.P.S. 10 enclosing a passenger space S. In the passenger space S, one bench-type seat 11 and its backrest 12 are disposed. Instead of the bench-type seat 11, a plurality of independent seats may be arranged in a row in some cases. R.O.P.S. is an abbreviation for roll-over protective structure. The R.O.P.S. 10 is detachably mounted on the vehicle body frame 1.

The vehicle body frame 1 is equipped with a main frame 2 having a pair of left and right main frame members 2a extended in the front-rear direction of the vehicle, a rear frame 3 formed at the rear end portion of the main frame 2, a bonnet frame 4 formed at the front end portion of the main frame 2, a dashboard frame 5 formed at the front upper end portion of the main frame 2, and a seat frame 6 disposed in the passenger space S.

A cargo bed support region for supporting a dump-type cargo bed 40 (indicated by a chain double-dashed line in FIG. 1) is formed in the range from the rear upper face of the main frame 2 to the upper face of the rear frame 3. Inside the main frame 2 and the rear frame 3 under the cargo bed support region, an engine room 7 is formed in which an engine and a transmission (not shown) are mounted. At the upper portion of the main frame 2, first and second cargo bed support members 2b and 2c are provided to support the cargo bed 40. The rear end lower portion of the R.O.P.S. 10 is mounted on the first cargo bed support member 2b, and the second cargo bed support member 2c is disposed at the rear portion of the main frame 2. Furthermore, on the front side and at both the left and right end portions of the first cargo bed support member 2b, cargo bed engaging device mounting portions 2e are provided to install a pair of left and right cargo bed engaging device 13 (refer to FIG. 3).

At the rear portion of the main frame 2, a frame-side gas damper mounting portion 2d is provided so as to be positioned above the substantially central portion of the rear portion in the vertical direction of the vehicle. At the rear portion of the rear frame 3, a pair of left and right cargo bed pivot portions 3a is provided so as to serve as the rotation fulcrum of the dump operation of the cargo bed 40.

The R.O.P.S. 10 includes a pair of left and right side units 30 made of metal pipes and first to fourth cross members 31 to 34 made of metal pipes and used to connect both the side units 30. Each side unit 30 is integrally equipped with a front pillar portion 30a, a rear pillar portion 30b, an intermediate pillar portion 30c, and an upper beam portion 30d. The front pillar portion 30a, the rear pillar portion 30b and the upper beam portion 30d are formed by bending and forming a single pipe member being circular in cross section into a substantially U shape in a side view. Each intermediate pillar portion 30c is disposed at a position approximately corresponding to the backrest 12 of the seat 11 and is fixed to a halfway portion of the upper beam portion 30d in the front-rear direction by welding.

Figure 2:
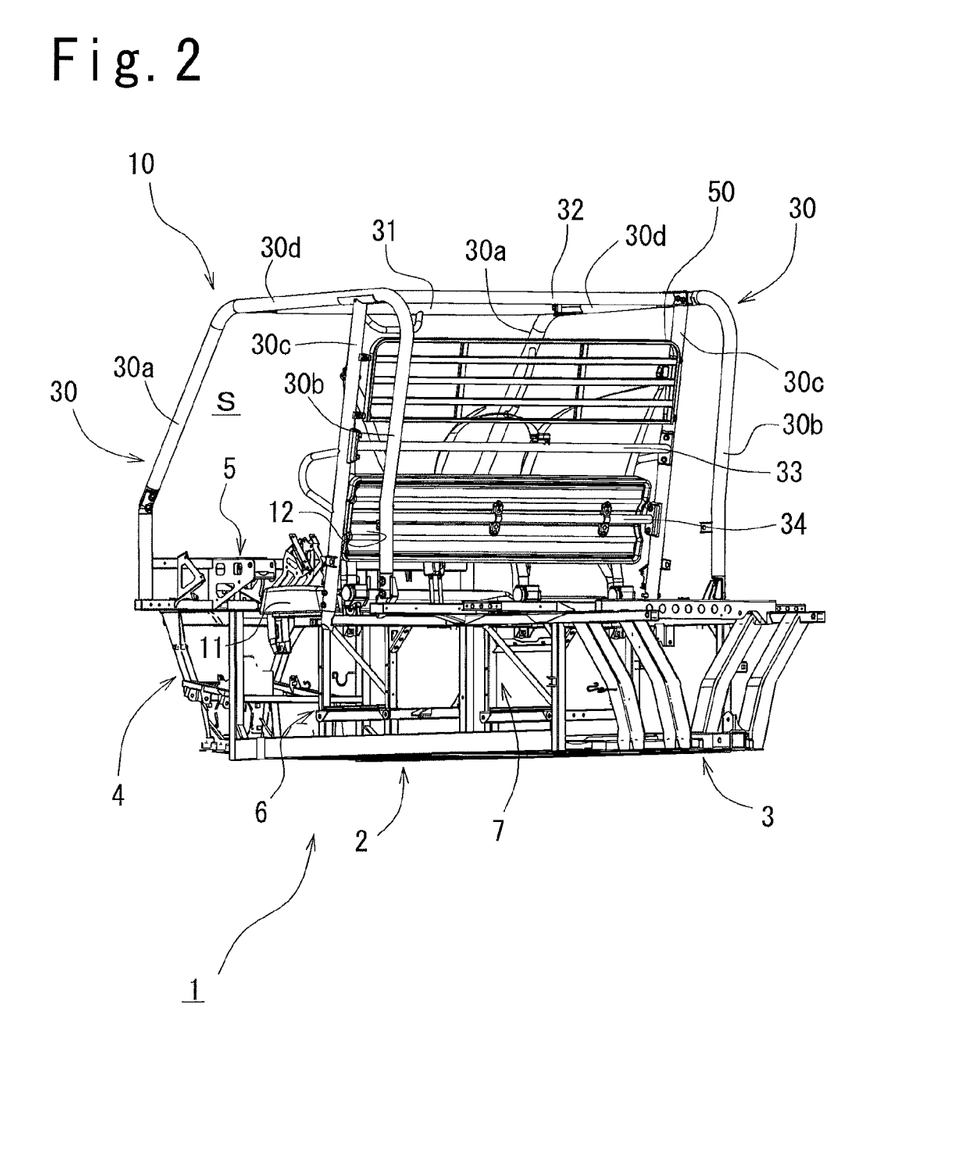
FIG. 2 is a perspective view showing the skeleton structure of the utility vehicle, seen from left rear.

Both the upper beam portions 30d are connected to each other using the first and second cross members 31 and 32. FIG. 2 is a perspective view showing the skeleton structure of the utility vehicle, seen from obliquely rear. As shown in FIG. 2, both the intermediate pillar portions 30c are connected to each other using the third cross member 33 at the substantially central portions thereof in the vertical direction and also connected to each other using the fourth cross member 34 at the substantially central portions between the third cross member 33 and the upper end portion of the seat frame 6 in the vertical direction.

The passenger space S is located between the two side units 30 and is defined as a space enclosed by the front pillar portions 30a, the intermediate pillar portions 30c and the upper beam portions 30d. Inside the passenger space S, the seat 11 is mounted on the upper face of the seat frame 6, and the backrest 12 is installed on the fourth cross member 34.

Figure 3:
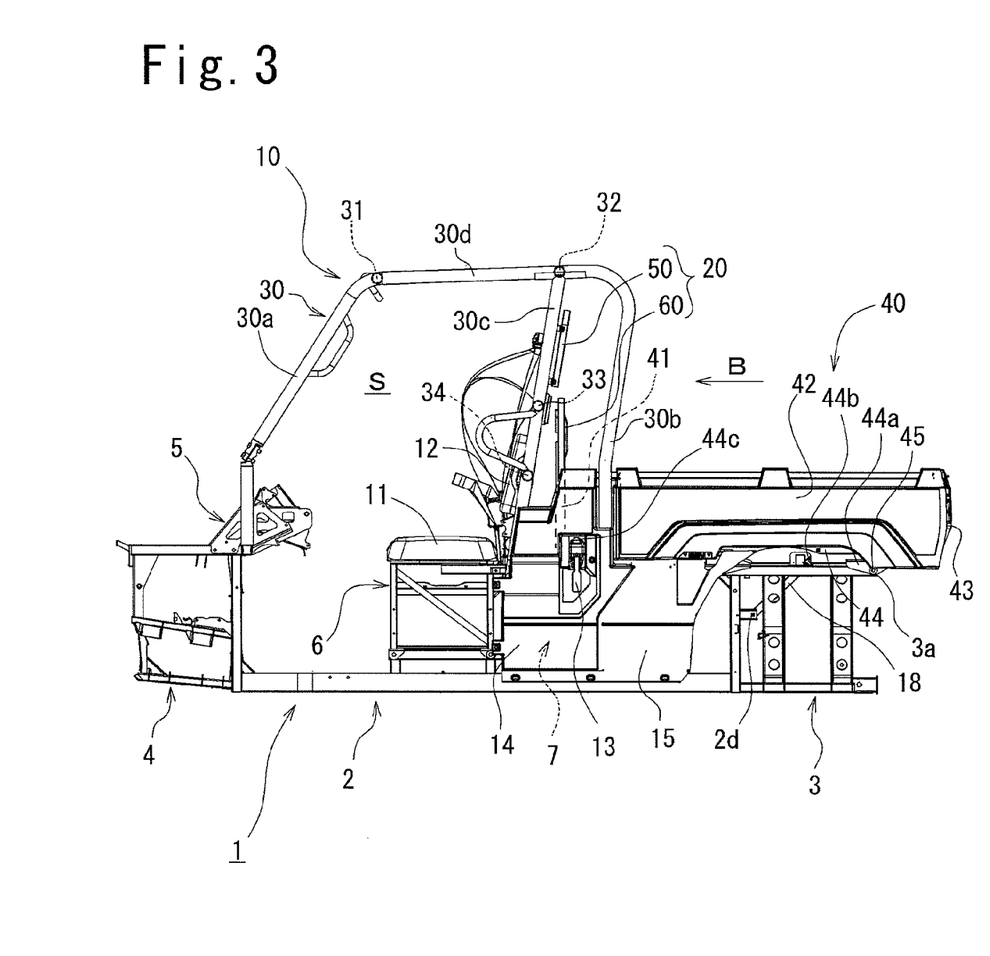
FIG. 3 is a left side view showing the utility vehicle shown in FIG. 1.
Figure 4:
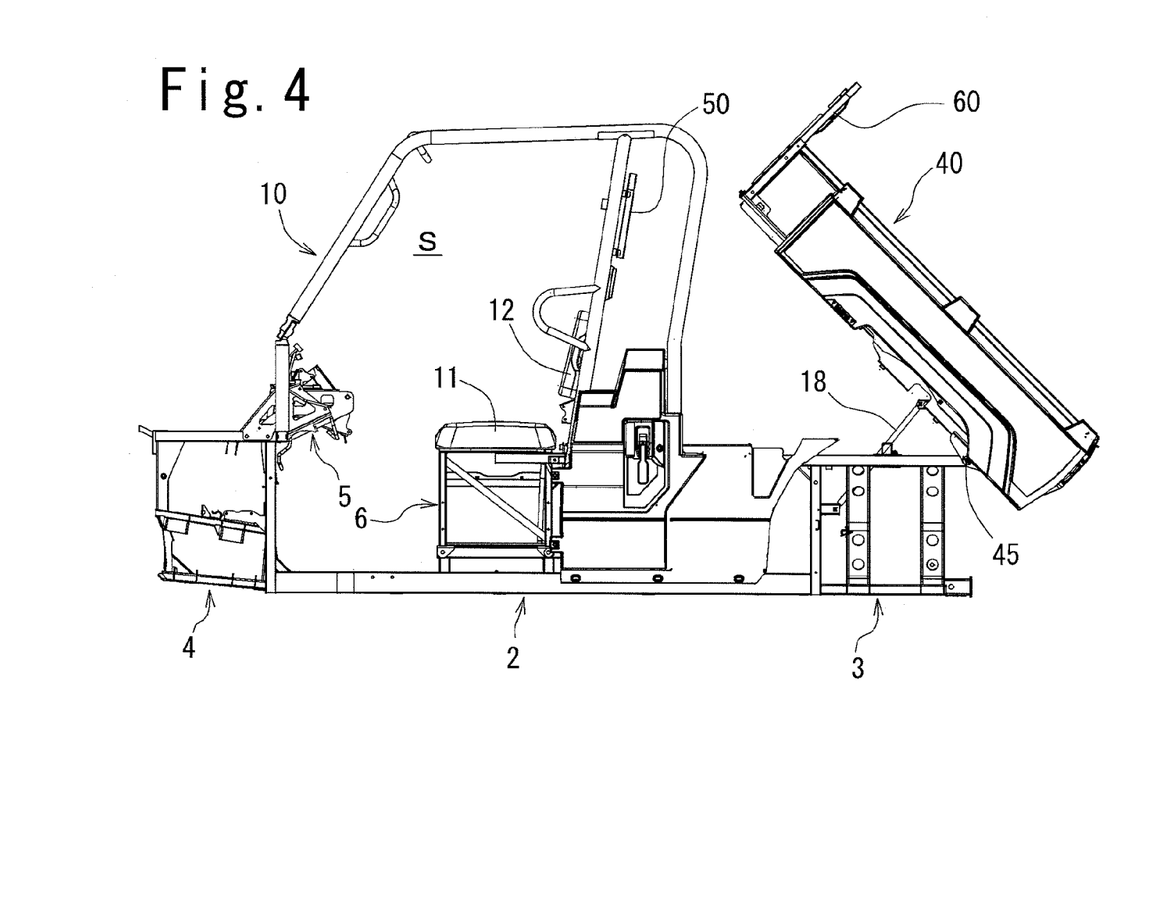
FIG. 4 is a left side view showing the utility vehicle in which a cargo bed has been moved to a dump position.

FIGS. 3 and 4 are left side views of the utility vehicle, showing the cargo bed 40, the cargo bed engaging device 13, first and second side covers 14 and 15, and a screen 20, in addition to the skeleton structure shown in FIG. 1. As shown in FIG. 3, the utility vehicle is equipped with the cargo bed 40 mounted in the cargo bed support region, the pair of left and right cargo bed engaging device 13 for engaging the cargo bed 40 with the vehicle body frame 1, the pair of left and right first side covers 14 and the pair of left and right second side covers 15 for covering both sides of the engine room 7, and the screen 20 disposed between the passenger space S and the cargo bed 40.

The screen 20 is divided into two portions, an upper screen 50 disposed in the R.O.P.S. 10 and a lower screen 60 disposed in the cargo bed 40. Note that, the screen 20 may be divided into three or more portions in the vertical direction, without being limited to being divided into two portions.

The first side cover 14 is disposed between the intermediate pillar portion 30c and the rear pillar portion 30b of the R.O.P.S. 10 so as to cover the area ranging from each of both sides of the front portion of the cargo bed 40 to the region below the cargo bed 40. The second side cover 15 continues to the rear portion of the first side cover 14 and is disposed so as to cover the region below the cargo bed 40.

[Structure of the Cargo Bed 40]

The cargo bed 40 is equipped with pivot shaft mounting portions 44a at its rear lower portion. The pivot shaft mounting portions 44a are rotatably mounted on the cargo bed pivot portions 3a of the rear frame 3 via a pivot shaft 45. Hence, the cargo bed 40 is configured so as to be movable around the pivot shaft 45 as a rotation fulcrum up and down between a normal position (refer to FIG. 3) in which its front portion is in a non-raised state and a dump position (refer to FIG. 4) in which the front portion is in a raised state.

The cargo bed 40 is equipped with a bottom wall 44 and is also equipped with a front wall 41, left and right side walls 42 and a rear wall 43 standing upward from the peripheral portions of the bottom wall 44. The front wall 41 is formed as a front wall portion 621 (refer to FIG. 8) serving as the substantially lower half portion of the lower screen 60. The details will be described later.

At the lower portion of the bottom wall 44, a cargo bed side gas damper mounting portion 44b is provided. A gas damper 18 is installed between the cargo bed side gas damper mounting portion 44b and the frame-side gas damper mounting portion 2d. The gas damper 18 assists the rotation of the cargo bed 40 from the normal position to the dump position and is configured so as to smoothly control the rotation of the cargo bed 40 from the dump position to the normal position. Note that, instead of the gas damper 18, an oil damper in which oil is used as an operating medium may also be adopted.

A pair of left and right hooks 44c is provided at both the front side portions of the bottom wall 44. When the cargo bed 40 is located at the normal position, the hooks 44c are disposed at positions in which the hooks 44c can be engaged with the cargo bed engaging device 13. Also, the hooks 44c may be provided at both the side frames 42d (refer to FIG. 10) which constitute the side wall 42.

Figure 5:
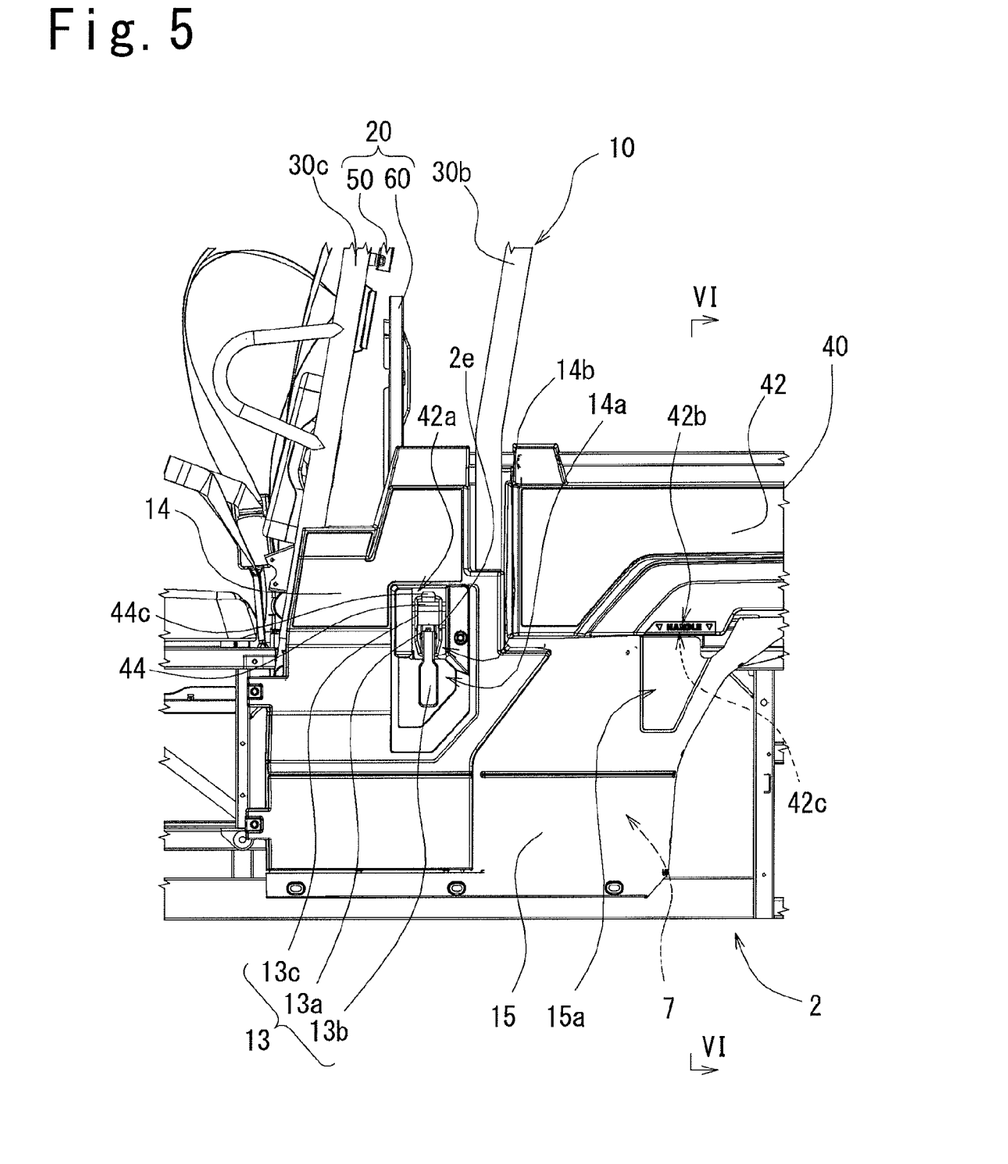
FIG. 5 is an enlarged left side view showing the utility vehicle.

As shown in the enlarged view of FIG. 5, both the side walls 42 are equipped with side wall openings 42a passing through in the width direction of the vehicle, and are also equipped with embossed letter signs 42b integrally formed with the outer side faces of the walls 42. As an example of the embossed letter sign 42b, "HANDLE" is used to indicate a grip portion that is used to raise the cargo bed 40. The side wall openings 42a are formed so as to face the hooks 44c of the cargo bed 40.

Figure 6:
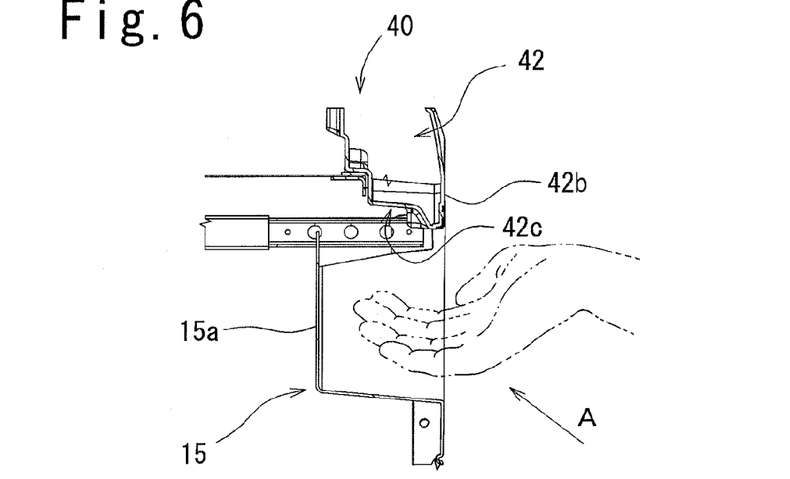
FIG. 6 is a sectional view taken on line VI-VI of FIG. 5.

FIG. 6 is a sectional view taken on line VI-VI of FIG. 5. As shown in FIG. 6, in the lower face of each side wall 42 and at the position corresponding to the embossed letter sign 42b, a concave portion 42c for allowing gripping and raising of the cargo use is formed inward of (and spaced apart from) an outer surface of the respective side wall (with respect to the vehicle width) so as to be dented (project) upward. The concave portion 42c for raising the cargo bed is provided inward in the width direction of the vehicle at a position away from the outer surface of the side wall 42 and is configured so as to be hooked by the fingers of the user's hand and gripped by the user's hand easily from the side of the cargo bed 40.

Figure 7:
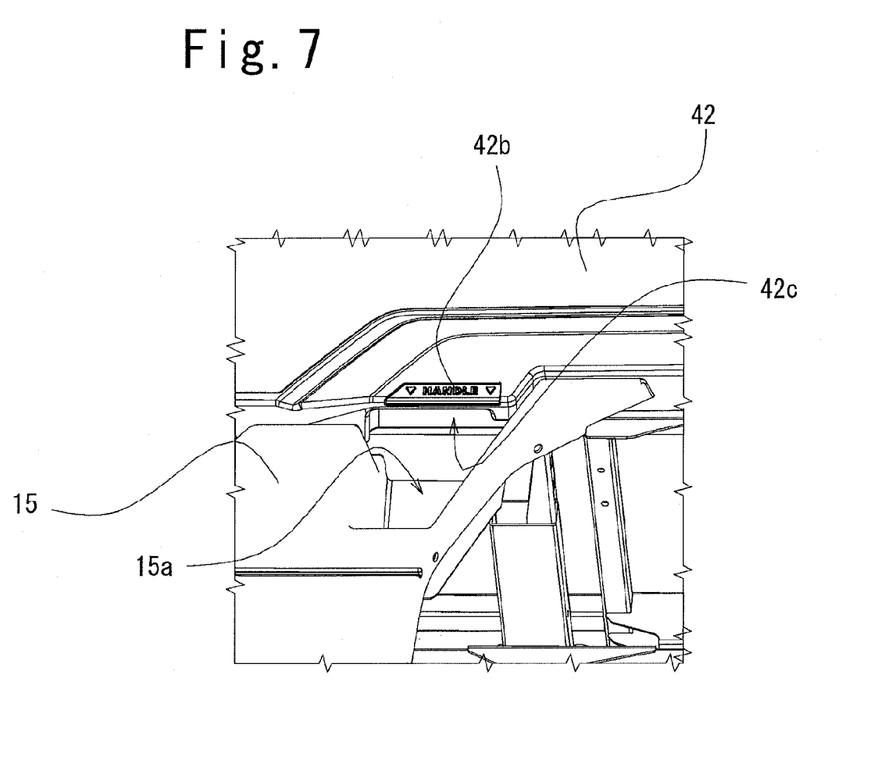
FIG. 7 is a perspective view taken along arrow A in FIG. 6.

FIG. 7 is a perspective view showing the concave portion 42c for cargo bed raising use, taken along arrow A in FIG. 6 and seen from below. As shown in FIG. 7, the concave portion 42c for raising the cargo bed is disposed at the position corresponding to the embossed letter sign 42b. Hence, the fingers of the user's hand can easily gain access to the concave portion 42c for raising the cargo bed by using the embossed letter sign 42b as a guide.

[Configuration of the Cargo Bed Engaging Device 13]

As shown in FIG. 5, the cargo bed engaging device 13 is a lever-type toggle clamp and is equipped with a base member 13a, a lever 13b, the upper portion of which is rotatably mounted on the base member 13a, and a band member 13c, the lower end portion of which is rotatably mounted on the lever 13b. The cargo bed engaging device 13 is mounted on the cargo bed engaging device mounting portion 2e of the main frame 2 via the base member 13a, and is configured so as to be engageable with the hooks 44c by rotating the lever 13b downward while the upper end portion of the band member 13c is hooked with the hook 44c provided on the cargo bed 40.

[Configuration of the First Side Cover 14]

Each first side cover 14 is equipped with a concave portion 14a for cargo bed engaging device disposition use in which the cargo bed engaging device 13 is accommodated. In the concave portion 14a for cargo bed engaging device disposition use, a first side cover opening 14b is formed so that the first side cover openings 14b on the left and right sides pass through in the width direction of the vehicle. The first side cover opening 14b is formed so as to overlap with the cargo bed engaging device mounting portion 2e of the main frame 2 and the hook 44c of the cargo bed 40 as shown in the side view of FIG. 5.

In other words, the state of the hook 44c can be checked through the first side cover opening 14b of the first side cover 14 and the side wall opening 42a of the cargo bed 40 from the side of the cargo bed 40. Hence, the engagement state of the engaging device 13 with the hook 44c can be checked easily.

[Configuration of the Second Side Cover 15]

The second side cover 15 is equipped with a concave portion 15a for hand insertion use. The concave portion 15a for hand insertion use is disposed at the position corresponding to the embossed letter sign 42b of the side wall 42 when the cargo bed 40 is located at the normal position. In other words, as shown in FIGS. 6 and 7, the concave portion 15a for hand insertion use is formed so that the concave portion 42c for cargo bed raising use is extended downward when the cargo bed 40 is located at the normal position, thereby being formed so as to have a size sufficient for the fingers of the user's hand to securely gain access to the concave portion 42c for cargo bed raising use.

Consequently, the fingers of the user's hand can easily gain access to the concave portion 42c for cargo bed raising use through the concave portion 15a for hand insertion use from the side of the cargo bed 40 by using the embossed letter sign 42b as a guide, whereby the workability of the dump operation of the cargo bed 40 can be improved.

[Structure of the Screen 20]

Figure 8:
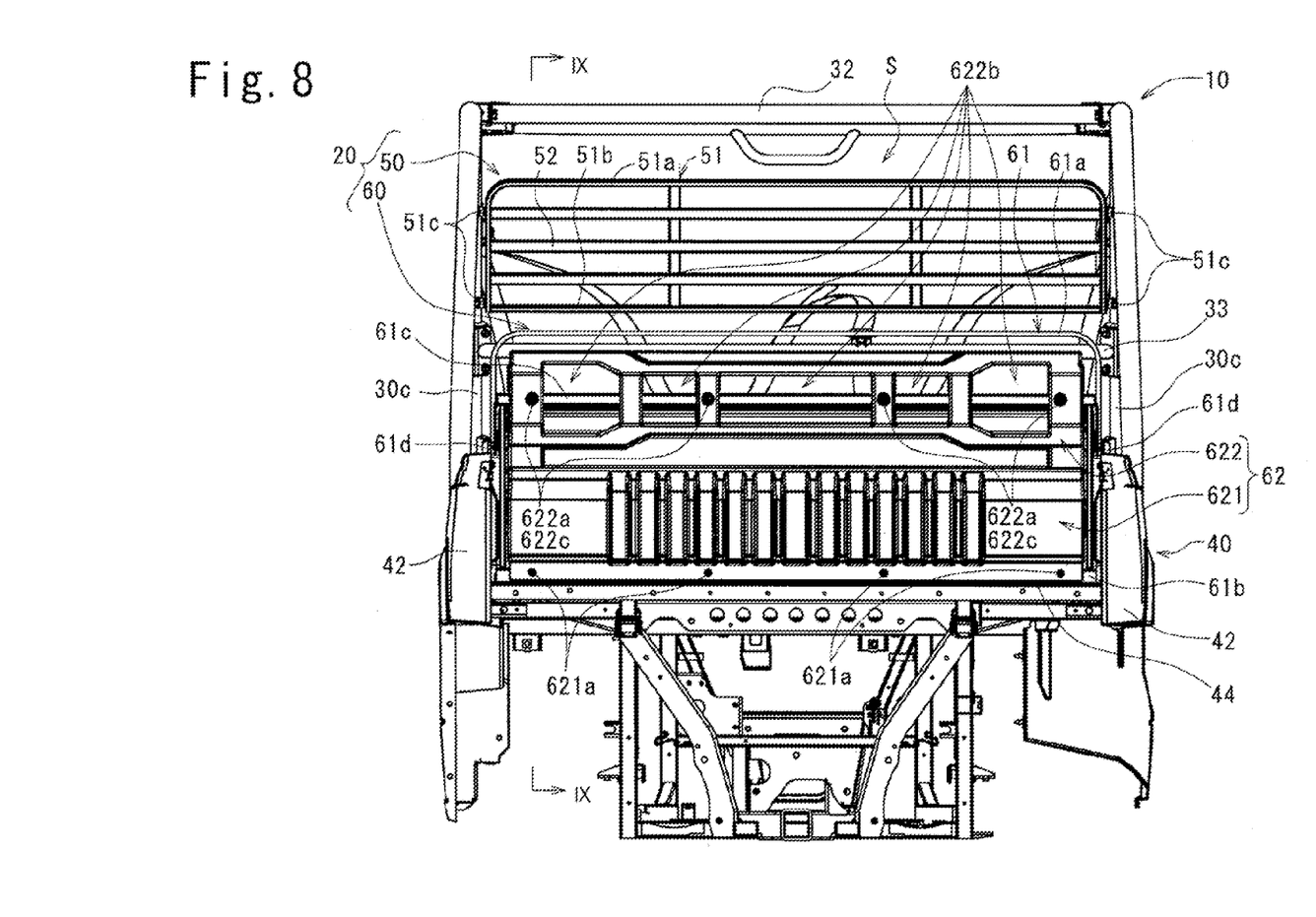
FIG. 8 is a front view showing the cargo bed, taken along arrow B in FIG. 3.

FIG. 8 is a front view showing the cargo bed 40, taken along arrow B in FIG. 3. As describe above, the screen 20 is divided into the upper screen 50 and the lower screen 60 in the vertical direction.

Between the second cross member 32 and the third cross member 33 in the vertical direction, the upper screen 50 is disposed in the width direction of the vehicle, that is, in the left-right direction of the passenger space S, and detachably mounted on both the intermediate pillar portions 30c of the R.O.P.S. 10 with bolts. The upper screen 50 has a lattice or grid shape as a whole and includes an upper frame portion 51 surrounding the four sides of the upper screen 50 and an upper screen body portion 52 disposed in the inner peripheral portion of the upper frame portion 51.

The upper frame portion 51 includes an upper U-shaped member 51a formed into a substantially inverted U shape and a lower end connection member 51b for connecting the lower end portions of the upper U-shaped member 51a. At both the left and right end portions of the upper U-shaped member 51a, mounting portions 51c for mounting the upper frame portion 51 on both the intermediate pillar portions 30c of the R.O.P.S. 10 are provided. The upper screen body portion 52 is formed by combining a plurality of metal pipes into a lattice shape, and its peripheral portion is joined to the inner peripheral face of the upper frame portion 51 by welding. The lattice shape of the upper screen body portion 52 is configured so that the passengers of the vehicle can confirm the rearward view of the vehicle through the upper screen 50 from the passenger space S.

The lower screen 60 is provided in the range from the upper face of the bottom wall 44 to the height approximately corresponding to the third cross member 33 of the R.O.P.S. 10 over the width of the cargo bed 40. The lower screen 60 includes a lower frame portion 61 and a lower screen body portion 62 mounted inside the lower frame portion 61.

The lower frame portion 61 includes a lower U-shaped member 61a formed into a substantially inverted U shape, a lower end connection member 61b for connecting the lower end portions of the lower U-shaped member 61a, and an intermediate connection member 61c for connecting the left and right sides of the upper portion of the lower U-shaped member 61a at the substantially central portion thereof in the vertical direction. Mounting portions 61d (refer to FIG. 10) for mounting the lower frame portion 61 on both side walls 42 of the cargo bed 40 are provided at both the left and right side portions of the lower U-shaped member 61a.

The lower screen body portion 62 is a resin molded product having a substantially rectangular shape in front view and is equipped with a front wall portion 621 extended between both the side walls 42 and a lower screen portion 622 extended above the front wall portion 621, that is, on the upper side from the both the side walls 42. The front wall portion 621 is equipped with bolt insertion holes 621a at its lower portion. The lower screen portion 622 is equipped with bolt insertion holes 622a and openings 622b at its substantially central portion in the vertical direction. The openings 622b are formed at positions facing the intermediate connection member 61c.

Figure 9:
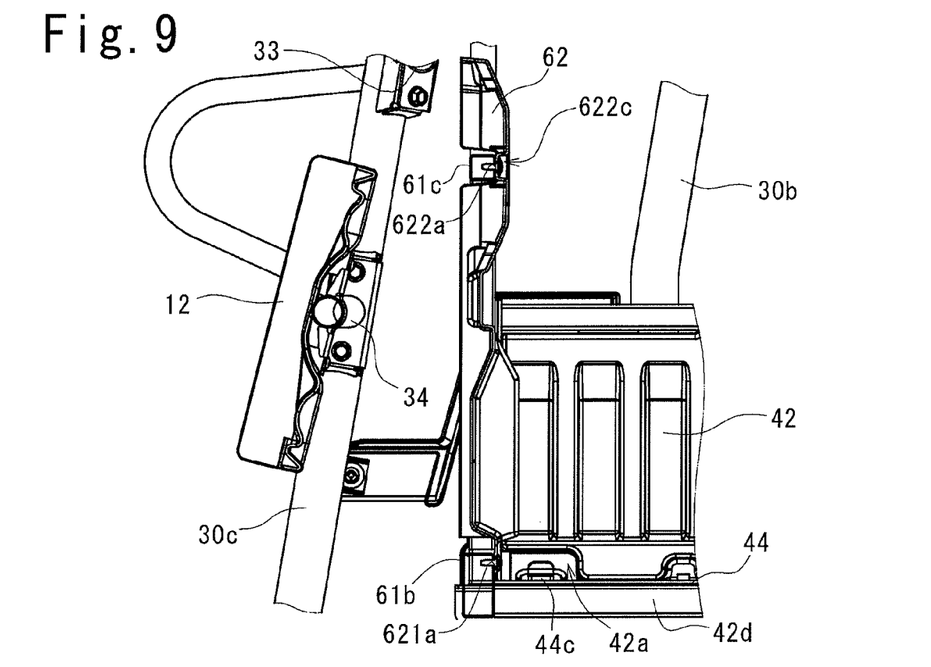
FIG. 9 is a sectional view taken on line IX-IX of FIG. 8.

FIG. 9 is a sectional view taken on line IX-IX of FIG. 8. As shown in FIG. 9, the lower screen body portion 62 is mounted on the lower end connection member 61b with bolts through the bolt insertion holes 621a and also mounted on the intermediate connection member 61c with bolts through the bolt insertion holes 622a. The bolt insertion holes 622a are formed in the bottom portions of concave portions 622c dented forward, and the head portions of the bolts inserted into the bolt insertion holes 622a are accommodated in the concave portions 622c.

Figure 10:
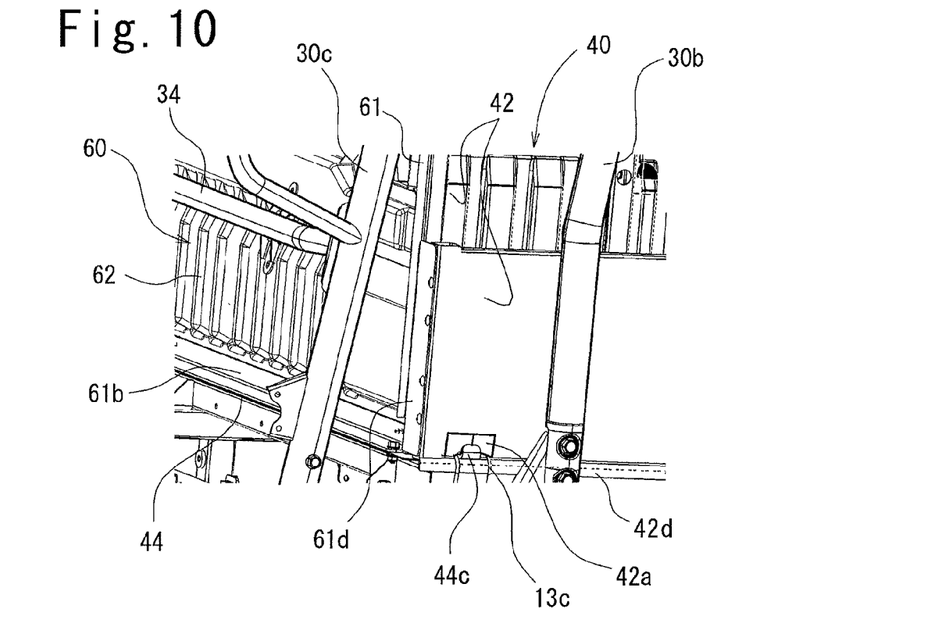
FIG. 10 is a perspective view showing the cargo bed, seen from left front.

FIG. 10 is a perspective view showing the connection portions between the lower screen 60 and the cargo bed 40. As shown in FIG. 10, the lower screen 60 is detachably mounted with bolts on the front end portion of the bottom wall 44 of the cargo bed 40 via the lower end connection member 61b and is also detachably mounted with bolts on the front end portions of both the side walls 42 of the cargo bed 40 via the left and right mounting portions 61d.

[Dump Operation of the Cargo Bed 40]

Figure 11:
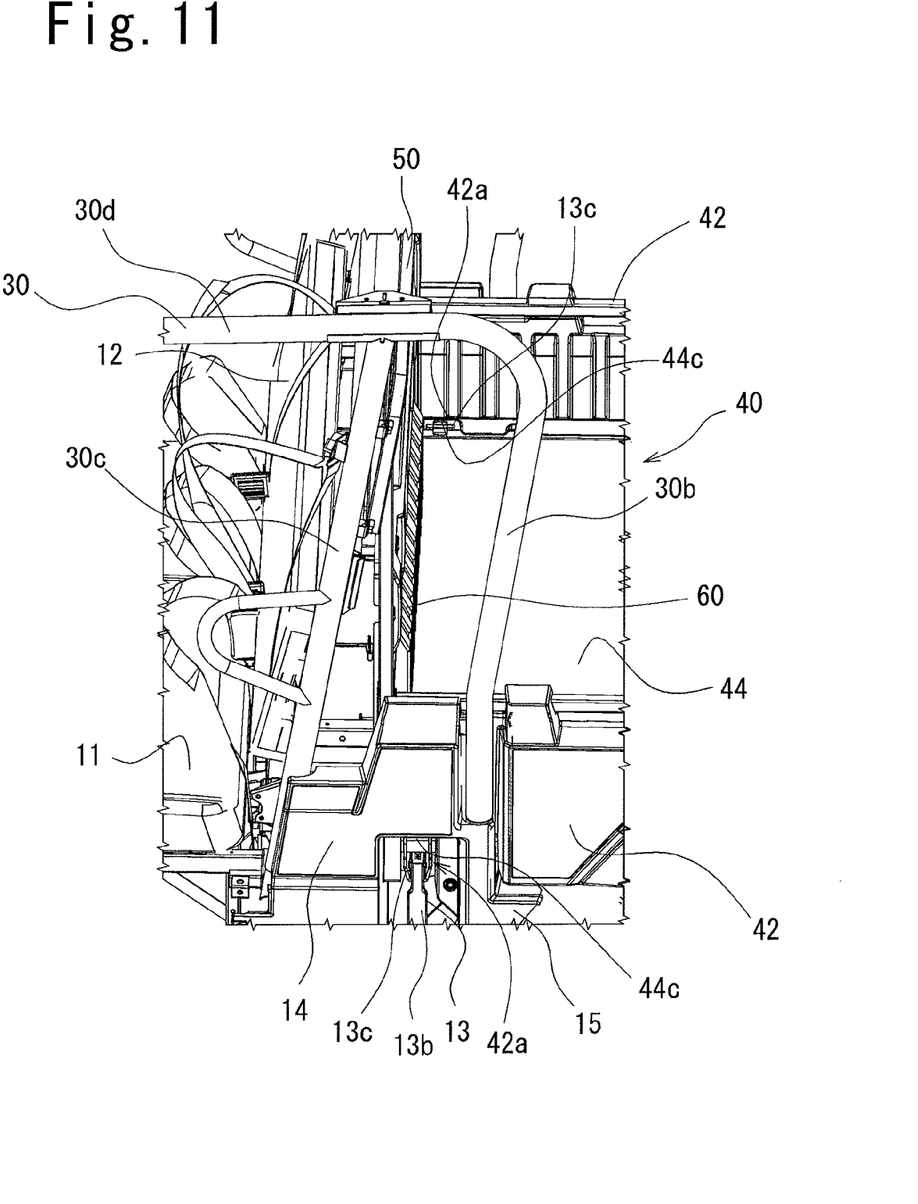
FIG. 11 is a perspective view showing the cargo bed, taken along arrow C in FIG. 8.

The dump operation of the cargo bed 40 will be described referring to FIGS. 11 and 12. FIG. 11 is a perspective view of the cargo bed 40, taken along arrow C in FIG. 8 and seen from above, and FIG. 12 is a left side view of the utility vehicle, showing the dump operation of the cargo bed 40.

First, the operation for moving the cargo bed 40 positioned at the normal position to the dump position will be described below. As shown in FIG. 11, on both sides of the cargo bed 40, the hooks 44c of the cargo bed 40 are disengaged by operating the levers 13b of the cargo bed engaging device 13. At this time, since the side wall openings 42a facing the hooks 44c are formed in both the side walls 42, the engagement states of the cargo bed engaging device 13 with both the hooks 44c can be checked from one side of the cargo bed 40. Hence, the time and labor required for the user to move to both sides of the cargo bed 40 to check the engagement states of both the hooks 44c with both the cargo bed engaging device 13 can be omitted.

Figure 12:
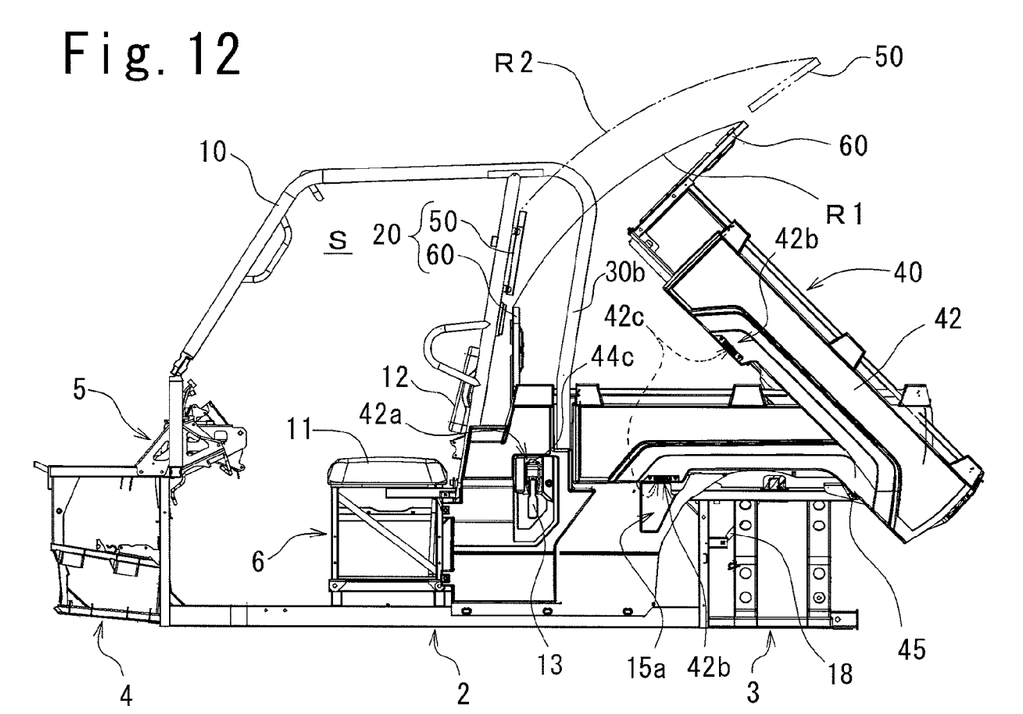
FIG. 12 is a left side view of the utility vehicle, showing the dump operation of the cargo bed.

Next, as shown in FIG. 12, on one side of the cargo bed 40, the user's hand is inserted into the concave portion 42c for cargo bed raising use from the concave portion 15a for hand insertion use, and while the concave portion 42c for cargo bed raising use is gripped, the cargo bed 40 is rotated so as to be raised upward. Since the rotation of the cargo bed 40 to the dump position is assisted by the energizing force of the gas damper 18 at this time, the cargo bed 40 can be rotated easily to the dump position.

The cargo bed 40 is rotated to the dump position with the pivot shaft 45 used as a rotation fulcrum. The dump position is determined by the stroke limit of the gas damper 18, and the cargo bed 40 is held at the dump position by the energizing force of the gas damper 18.

Next, the operation for moving the cargo bed 40 located at the dump position to the normal position will be described below. The upper portion of the cargo bed 40, for example, the upper portion of the side wall 42, is gripped and the cargo bed 40 is pulled downward. At this time, the rotation movement of the cargo bed 40 from the dump position to the normal position is controlled slowly by the gas damper 18. As shown in FIG. 11, in a state in which the cargo bed 40 is located at the normal position, the left and right hooks 44c provided on the cargo bed 40 are engaged with the cargo bed engaging device 13. At this time, the engagement states of both the hooks 44c can be checked easily from one side of the cargo bed 40 through the side wall openings 42a provided in both the side walls 42.

Furthermore, as shown in FIG. 12, the screen 20 is divided into two portions in the vertical direction, that is, the upper screen 50 and the lower screen 60, so that only the lower screen 60 is rotated together with the cargo bed 40 during the dump operation. Hence, the rotation locus R1 of the cargo bed 40 can be made smaller than the rotation locus R2 of the cargo bed 40 in the case that the entire screen 20 is integrated with the cargo bed 40.

Consequently, even in the case that a member disposed above, for example, a roof portion, is provided for the utility vehicle or even in the case that a cross member is provided to connect both the rear pillar portions 30b, the interference between the rotation locus R1 of the cargo bed 40 and these members can be avoided easily. Hence, it is possible to improve not only the degree of freedom of designing the screen but also the degrees of freedom of designing the roof portion and the cross member. Furthermore, even in the case that surrounding objects placed on roads or surrounding objects, such as the roof portions of parking areas, are located around the upper part of the utility vehicle, interference with these surrounding objects can be avoided easily. In other words, it is possible to alleviate height limitation with respect to the dump operation of the cargo bed 40.

In the utility vehicle according to the above-mentioned embodiment, the following advantages can be achieved.

(1) Since the concave portions 42c for cargo bed raising use are integrally formed with the side walls 42 of the cargo bed 40, it is not necessary to provide separate members as grip portions for raising the cargo bed 40, whereby the design of the grip portions can be rationalized. Hence, the number of components is decreased and man-hours for installation are reduced, whereby the productivity of the utility vehicle is improved and its cost can be reduced.

(2) Since the grip portions provided as separate members can be made unnecessary, the weight of the cargo bed 40 is reduced, whereby the workability of the dump operation of the cargo bed 40 can be improved.

(3) The fingers of the user's hand can easily gain access to each concave portion 42c for cargo bed raising use through the concave portion 15a for hand insertion use without interfering with the second side cover 15. Hence, the workability of the dump operation of the cargo bed 40 can be improved further. The fingers of the user's hand can easily gain access to the concave portion 15a for hand insertion use by using the embossed letter sign 42b as a guide.

(4) Since the engagement states between the hooks 44c and the cargo bed engaging device 13 can be confirmed easily through the side wall openings 42a, the workability of the engagement of the cargo bed engaging device 13 with the hooks 44c can be improved. In addition, the engagement states of both the left and right cargo bed engaging device 13 can be confirmed simultaneously through the side wall openings 42a from one end side of the utility vehicle in the width direction thereof. Hence, time and labor for the user to move to both sides of the cargo bed 40 can be omitted, and the state of the cargo bed 40 fixed to the vehicle body frame 1 can be confirmed in a short time.

(5) Since the rotation of the cargo bed 40 from the normal position to the dump position is assisted by the gas damper 18, the workability of the dump operation of the cargo bed 40 can be improved. Furthermore, by the gas damper 18, the position of the cargo bed 40 located at the dump position can be held, and the rotation from the dump position to the normal position can be implemented slowly.

(6) Since the grip portions can be provided without protruding from the lower portion of the cargo bed 40, the lower portion of the cargo bed 40 can be configured to have a simple external appearance, and the appearance of the utility vehicle can be enhanced easily.

In this embodiment, the concave portion 42c for cargo bed raising use is formed so as to be dented upward from the lower face of the side wall 42 of the cargo bed 40. However, without being limited to this configuration, the concave portion may be formed on the side face of the side wall 42. In other words, it may also be possible that the concave portion for cargo bed raising use is dented inward in the width direction of the vehicle from the surface of each of both the side walls 42 on the outer side of the vehicle in the width direction of the vehicle. With this configuration, it is not necessary to provide grip portions as separate members, whereby the design of the grip portions can be rationalized.

The present invention is not limited to the above-mentioned embodiments, and can include various modifications conceivable within the scope not departing from the contents of the claims.

What is claimed is:

1. A utility vehicle comprising:
a chassis;
one or more rows of seats disposed on the chassis; and
a cargo bed disposed behind the one or more rows of seats;
wherein the cargo bed is rotatably supported by a pivot shaft of the chassis so as to be movable up and down between a normal position in which the cargo bed is in a non-raised state, and a dump position in which the cargo bed is in a raised state; and
wherein concave portions for raising the cargo bed by hand are integrally formed, respectively, in a left side wall and a right side wall of the cargo bed, the concave portions being located inward of and spaced apart at a predetermined interval from an outer wall surface of a bottom portion of a respective one of the left side wall and the right side wall with respect to a widthwise direction of the cargo bed, each of the concave portions projecting upwardly.

2. The utility vehicle according to claim 1, further comprising side covers below the cargo bed for covering sides of the chassis,
wherein concave portions for hand insertion use are integrally formed at positions in upper portions of the side covers corresponding to the concave portions for raising the cargo bed so that the concave portions for raising the cargo bed extend downward.

3. The utility vehicle according to claim 1, further comprising a pair of left and right hooks at respective sides of the cargo bed,
wherein the cargo bed is configured to be fixed in the normal position by engaging the pair of left and right hooks with a pair of left and right engaging devices provided on the chassis, and openings through which the hooks are visible from sides of the cargo bed are formed, respectively, in the left side wall and the right side wall of the cargo bed.

4. The utility vehicle according to claim 1, further comprising a damper between the cargo bed and the chassis to energize the cargo bed to the dump position and/or to slow a rotation of the cargo bed from the dump position to the normal position.

5. A utility vehicle comprising:
a chassis;
one or more rows of seats disposed on the chassis;
a cargo bed disposed behind the one or more rows of seats; and
side covers below the cargo bed for covering sides of the chassis;
wherein the cargo bed is rotatably supported by a pivot shaft of the chassis so as to be movable up and down between a normal position in which the cargo bed is in a non-raised state, and a dump position in which the cargo bed is in a raised state;
wherein concave portions for raising the cargo bed by hand are integrally formed, respectively, in a left side wall and a right side wall of the cargo bed, concave portions for hand insertion use being integrally formed at positions in upper portions of the side covers corresponding to the concave portions for raising the cargo bed so that the concave portions for raising the cargo bed extend downward.

6. A utility vehicle comprising:
a chassis;
one or more rows of seats disposed on the chassis;
a cargo bed disposed behind the one or more rows of seats; and
a pair of left and right hooks at respective sides of the cargo bed;
wherein the cargo bed is rotatably supported by a pivot shaft of the chassis so as to be movable up and down between a normal position in which the cargo bed is in a non-raised state, and a dump position in which the cargo bed is in a raised state;
wherein concave portions for raising the cargo bed by hand are integrally formed, respectively, in a left side wall and a right side wall of the cargo bed;
wherein the cargo bed is configured to be fixed in the normal position by engaging the pair of left and right hooks with a pair of left and right engaging devices provided on the chassis, and openings through which the hooks are visible from sides of the cargo bed are formed, respectively, in the left side wall and the right side wall of the cargo bed.

* * * * *